United States Patent
Sundararajan et al.

(10) Patent No.: US 11,044,712 B2
(45) Date of Patent: Jun. 22, 2021

(54) REFERENCE SIGNAL PURPOSE INDICATION

(71) Applicants: QUALCOMM Incorporated, San Diego, CA (US); Jay Kumar Sundararajan, San Diego, CA (US); Alexandros Manolakos, San Diego, CA (US); Wanshi Chen, San Diego, CA (US); Yu Zhang, Beijing (CN); Haitong Sun, Cupertino, CA (US)

(72) Inventors: Jay Kumar Sundararajan, San Diego, CA (US); Alexandros Manolakos, San Diego, CA (US); Wanshi Chen, San Diego, CA (US); Yu Zhang, Beijing (CN); Haitong Sun, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/341,836

(22) PCT Filed: Nov. 10, 2017

(86) PCT No.: PCT/CN2017/110450
§ 371 (c)(1),
(2) Date: Apr. 12, 2019

(87) PCT Pub. No.: WO2018/086587
PCT Pub. Date: May 17, 2018

(65) Prior Publication Data
US 2019/0320419 A1 Oct. 17, 2019

(30) Foreign Application Priority Data

Nov. 11, 2016 (WO) ................ PCT/CN2016/105429

(51) Int. Cl.
*H04L 5/00* (2006.01)
*H04W 72/04* (2009.01)
(Continued)

(52) U.S. Cl.
CPC .......... *H04W 72/042* (2013.01); *H04L 5/0048* (2013.01); *H04W 24/10* (2013.01); *H04W 72/10* (2013.01)

(58) Field of Classification Search
CPC ... H04W 72/042; H04W 72/10; H04W 24/10; H04L 5/0048
See application file for complete search history.

(56) References Cited

U.S. PATENT DOCUMENTS 9,392,633 B2  7/2016  Lee et al.
2014/0241274 A1  8/2014  Lee et al.
(Continued)

FOREIGN PATENT DOCUMENTS

CN  102685795 A  9/2012
CN  102754457 A  10/2012
(Continued)

OTHER PUBLICATIONS

International Search Report and Written Opinion—PCT/CN2016/105429—ISA/EPO—dated Aug. 2, 2017.
(Continued)

*Primary Examiner* — Kent Krueger
(74) *Attorney, Agent, or Firm* — Qualcomm Incorporated

(57) ABSTRACT

Certain aspects of the present disclosure provide techniques for indicating a purpose for a reference signal. According to certain aspects, a method of wireless communication by a user equipment (UE) is provided. The method generally includes receiving an indication of a purpose of a reference signal (RS) from a base station (BS) and processing the RS in accordance with the indicated purpose.

28 Claims, 8 Drawing Sheets

(51) Int. Cl.
*H04W 24/10* (2009.01)
*H04W 72/10* (2009.01)

(56) References Cited

U.S. PATENT DOCUMENTS

| | | | | |
|---|---|---|---|---|
| 2019/0123864 A1* | 4/2019 | Zhang | ............. | H04B 7/0695 |
| 2019/0245603 A1* | 8/2019 | Yum | ............. | H04B 7/0617 |
| 2019/0349784 A1* | 11/2019 | Tang | ............. | H04L 5/0023 |

FOREIGN PATENT DOCUMENTS

| | | |
|---|---|---|
| CN | 103959692 A | 7/2014 |
| EP | 2763339 A1 | 8/2014 |
| WO | 2014079025 A1 | 5/2014 |
| WO | 2016046771 A1 | 3/2016 |

OTHER PUBLICATIONS

International Search Report and Written Opinion—PCT/CN2017/110450—ISA/EPO—dated Jan. 26, 2018.
Interdigital Communications: "Reference Signal Principles for NR", 3GPP Draft, 3GPP TSG-RAN WG1 #84 bis, R1-162578, 3rd Generation Partnership Project (3GPP), Mobile Competence Centre, 650, Route Des Lucioles, F-06921 Sophia-Antipolis Cedex, France vol. RAN WG1. No. Busan. Korea, Apr. 11, 2016-Apr. 15, 2016 Apr. 2, 2016 (Apr. 2, 2016), XP051080267, pp. 1-3, Retrieved from the Internet: URL:http://www.3gpp.org/ftp/tsg_ran/WG1_RL1/TSGR1_84b/Docs/ [retrieved on Apr. 2, 2016], paragraph 3.
LG Electronics: "Remaining issues on RAT-Dependent Positioning Enhancements", 3GPP Draft, 3GPP TSG RAN WG1 Meeting #83, R1-156879, 3rd Generation Partnership Project (3GPP), Mobile Competence Centre, 650, Route Des Lucioles, F-06921 Sophia-Antipolis Cedex, France, vol. RAN WG1, No. Anaheim, USA, Nov. 16, 2015-Nov. 20, 2015, Nov. 15, 2015 (Nov. 15, 2015), XP051003235, pp. 1-2, Retrieved from the Internet: URL:http://www.3gpp.org/ftp/Meetings 3GPPSYNC/RAN1/Docs/ [retrieved on Nov. 15, 2015].
Qualcomm Europe: "Details of CSI-RS", 3GPP Draft, 3GPP TSG-RAN WG1 #59, R1-094867, 3rd Generation Partnership Project (3GPP), Mobile Competence Centre, 650, Route Des Lucioles, F-06921 Sophia-Antipolis Cedex, France, vol. RAN WG1, No. Jeju, Korea, Nov. 9-13, 2009, XP050597855, pp. 1-6, [retrieved on Nov. 3, 2009], paragraph 2.2, figure 1.
Supplementary European Search Report—EP17868845—Search Authority—Munich—dated May 12, 2020.

* cited by examiner

REFERENCE SIGNAL PURPOSE INDICATION

This application is a national stage application under 35 U.S.C. 371 of PCT/CN2017/110450, filed Nov. 10, 2017, which claims benefit of International Application No. PCT/CN2016/105429 filed Nov. 11, 2016, both of which are incorporated herein by reference in their entireties.

INTRODUCTION

Aspects of the present disclosure generally relate to wireless communication systems, and more particularly, to indicating a reference signal purpose for uplink and downlink reference signals in a wireless communication system.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of base stations (BSs) that can support communication for a number of user equipments (UEs). A UE may communicate with a BS via the downlink and uplink. The downlink (or forward link) refers to the communication link from the BS to the UE, and the uplink (or reverse link) refers to the communication link from the UE to the BS.

These multiple access technologies have been adopted in various telecommunication standards to provide a common protocol that enables different wireless devices to communicate on a municipal, national, regional, and even global level. An example of an emerging telecommunication standard is new radio (NR, e.g., 5G radio access). NR is a set of enhancements to the LTE mobile standard promulgated by Third Generation Partnership Project (3GPP). NR is designed to better support mobile broadband Internet access by improving spectral efficiency, lower costs, improve services, make use of new spectrum, and better integrate with other open standards using OFDMA with a cyclic prefix (CP) on the downlink (DL) and on the uplink (UL) as well as support beamforming, multiple-input multiple-output (MIMO) antenna technology, and carrier aggregation. However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

In an aspect of the present disclosure, a method for wireless communications is provided. The method may be performed, for example, by a user equipment (UE). The method generally includes receiving an indication of a purpose of a reference signal (RS) from a base station (BS) and processing the RS in accordance with the indicated purpose.

In an aspect of the present disclosure, a method for wireless communications is provided. The method may be performed, for example, by a base station (BS). The method generally includes generating a message having an indication of a purpose of a reference signal (RS) and outputting the message for transmission to a user equipment (UE).

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
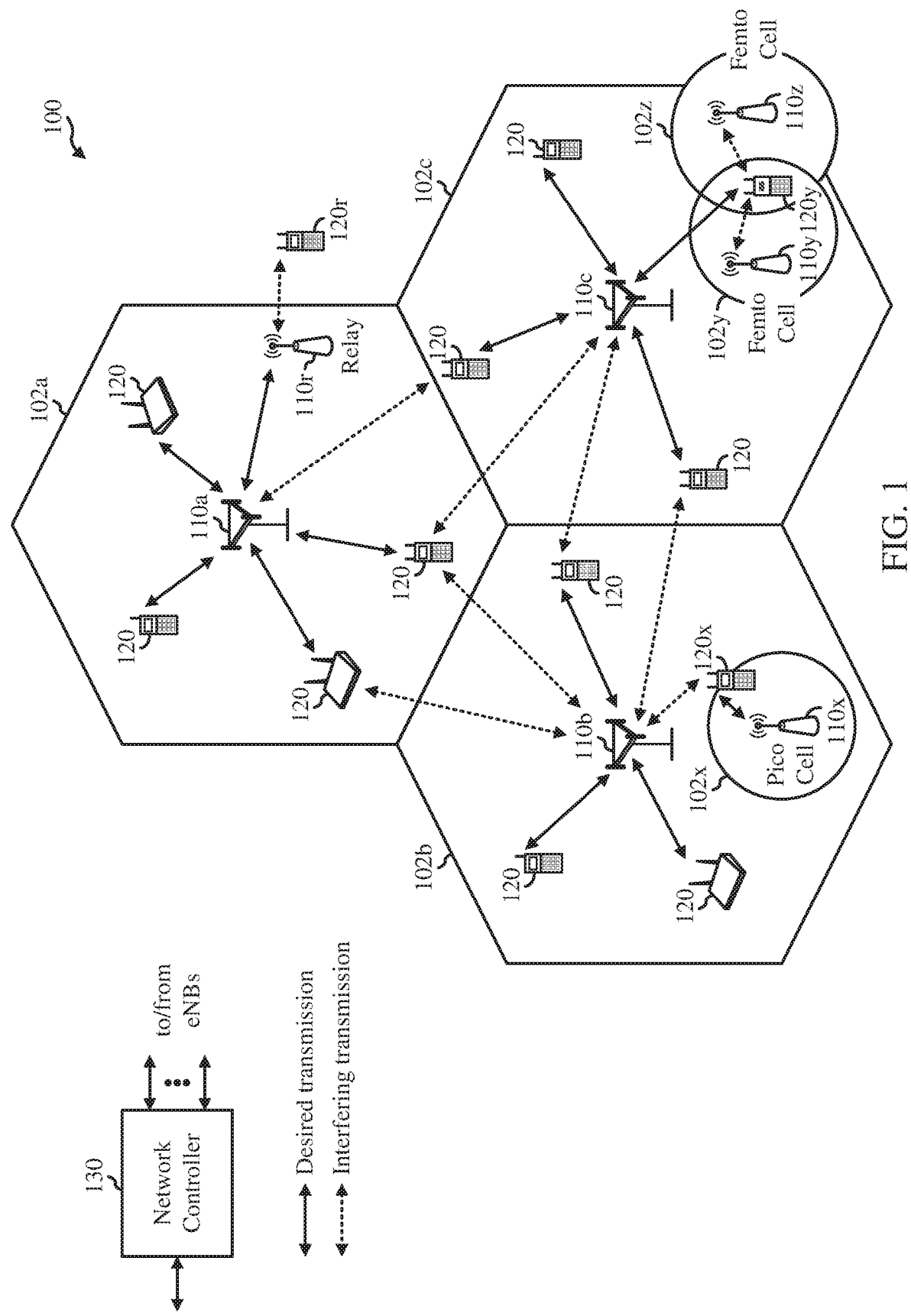
FIG. 1 is a block diagram conceptually illustrating an example telecommunications system, according to aspects of the present disclosure.

Aspects of the present disclosure provide apparatus, methods, processing systems, and computer program products for receiving an indication of a purpose of a reference signal (RS) from a base station (BS) and processing the RS in accordance with the indicated purpose. New radio may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include enhanced mobile broadband (eMBB) targeting wide bandwidth (e.g., 80 MHz and beyond), millimeter wave (mmW) targeting high carrier frequency (e.g., 60 GHz), massive machine type communications (mMTC) targeting non-backward compatible machine type communication (MTC) techniques, and mission critical targeting ultra reliable low latency communications (URLLC). For these general topics, different techniques are considered, such as coding, low-density parity check (LDPC), and polar. NR cell may refer to a cell operating according to the new air interface or fixed transport layer. A NR NodeB (e.g., 5G NodeB) may correspond to one or more transmission and reception points (TRPs). A 5G NodeB may also be referred to as an access node (AN), and may comprise an access node controller (ANC) and one or more TRPs.

A UE may exchange (e.g., transmit and/or receive) various signals with a BS. These signals include various reference signals (RS) including uplink and downlink RSs. These RSs may be used by UEs and BSs to perform uplink and downlink channel estimation and if reciprocity allows (e.g., meaning reciprocity may be assumed), for example, UL RS to be used for DL channel estimation, and vice versa. These RS may also be customized to serve specific purposes and it may be useful to be able to identify certain RS to restrict the use of that RS where reciprocity may otherwise apply. According to aspects of the present disclosure, a UE may receive an indication of a purpose for a RS from a BS and process the RS in accordance with the indicated purpose.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio or 5G network. UEs 120 may be configured to perform the operations 800 discussed in more detail below for wirelessly communicating enciphered messages with a cell. BS 110 may comprise a transmission and reception point (TRP) configured to perform the operations 900 discussed in more detail below for wirelessly communicating enciphered messages to the UE 120. The NR network may include a central unit that may be configured, with the UEs 120 and the BS 110, to perform operations related to measurement configuration, measurement reference signal transmission, monitoring, detection, measurement, and measurement reporting.

The system illustrated in FIG. 1 may be, for example, a long term evolution (LTE) network. The wireless network 100 may include a number of BSs (e.g., NodeBs, evolved NodeBs (eNB), 5G NodeBs, access nodes, TRPs, etc.) 110 and other network entities. A BS may be a station that communicates with the UEs and may also be referred to as a NodeB, an enhanced NodeB (eNodeB), a gateway-station NodeB (gNB), an access point, etc. A NodeB and 5G NodeB (e.g., a transmission and reception point, an access node) are other examples of stations that communicate with the UEs.

Each BS 110 may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscriptions. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro NodeB. A BS for a pico cell may be referred to as a pico NodeB. A BS for a femto cell may be referred to as a femto NodeB or a home NodeB. In the example shown in FIG. 1, the BSs 110a, 110b and 110c may be macro NodeBs for the macro cells 102a, 102b and 102c, respectively. The BS 110x may be a pico NodeB for a pico cell 102x. The BSs 110y and 110z may be femto NodeBs for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay NodeB, a relay, etc.

The wireless network 100 may be a heterogeneous network that includes BSs of different types, e.g., macro NodeBs, pico NodeBs, femto NodeBs, relays, transmission and reception points (TRPs), etc. These different types of BSs may have different transmit power levels, different coverage areas, and different impact on interference in the wireless network 100. For example, macro NodeBs may have a high transmit power level (e.g., 20 Watts) whereas pico NodeBs, femto NodeBs and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with macro NodeBs, pico NodeBs, femto NodeBs, relays, access nodes, TRPs, etc. In FIG. 1, a solid line with double arrows indicates desired transmissions between a UE and a serving NodeB, which is a NodeB designated to serve the UE on the downlink and/or uplink. A dashed line with double arrows indicates interfering transmissions between a UE and a NodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units or distributed units.

Figure 2:
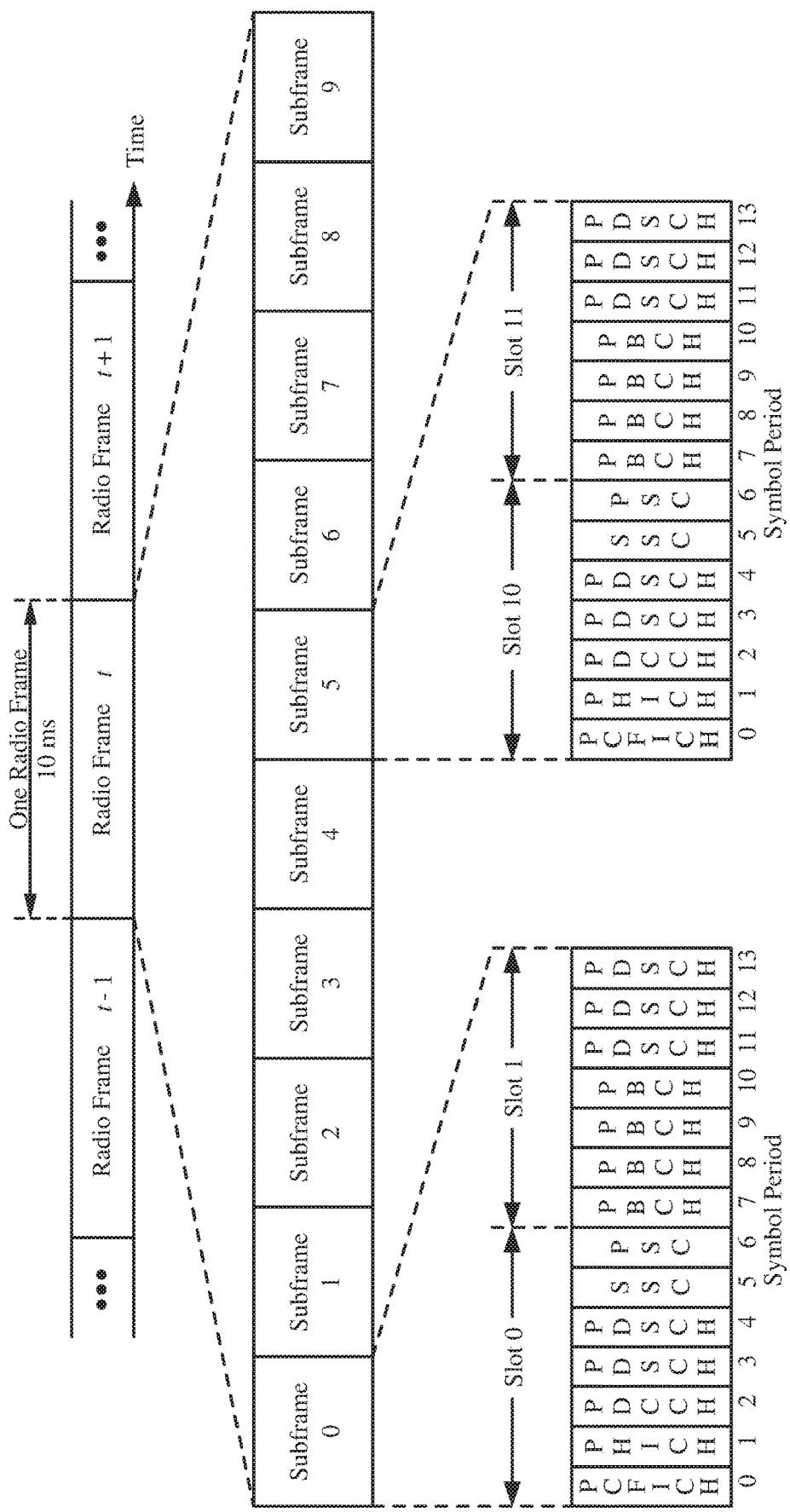
FIG. 2 is a block diagram conceptually illustrating an example downlink frame structure in a telecommunications system, according to aspects of the present disclosure.

FIG. 2 shows a down link (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each sub-frame may be assigned indices of 0 through 2L−1. The available time frequency resources may be partitioned into resource blocks. Each resource block may cover N subcarriers (e.g., 12 subcarriers) in one slot.

In LTE, a NodeB may send a primary synchronization signal (PSS) and a secondary synchronization signal (SSS) for each cell in the NodeB. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The NodeB may send a Physical Broadcast Channel (PBCH) in symbol periods 0 to 3 in slot 1 of sub-frame 0. The PBCH may carry certain system information.

The NodeB may send a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The NodeB may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The NodeB may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The NodeB may send the PSS, SSS and PBCH in the center 1.08 MHz of the system bandwidth used by the NodeB. The NodeB may send the PCFICH and PHICH across the entire system bandwidth in each symbol period in which these channels are sent. The NodeB may send the PDCCH to groups of UEs in certain portions of the system bandwidth. The NodeB may send the PDSCH to specific UEs in specific portions of the system bandwidth. The NodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A NodeB may send the PDCCH to the UE in any of the combinations that the UE will search.

A UE may be within the coverage of multiple NodeBs. One of these NodeBs may be selected to serve the UE. The serving NodeB may be selected based on various criteria such as received power, path loss, signal-to-noise ratio (SNR), etc.

Figure 3:
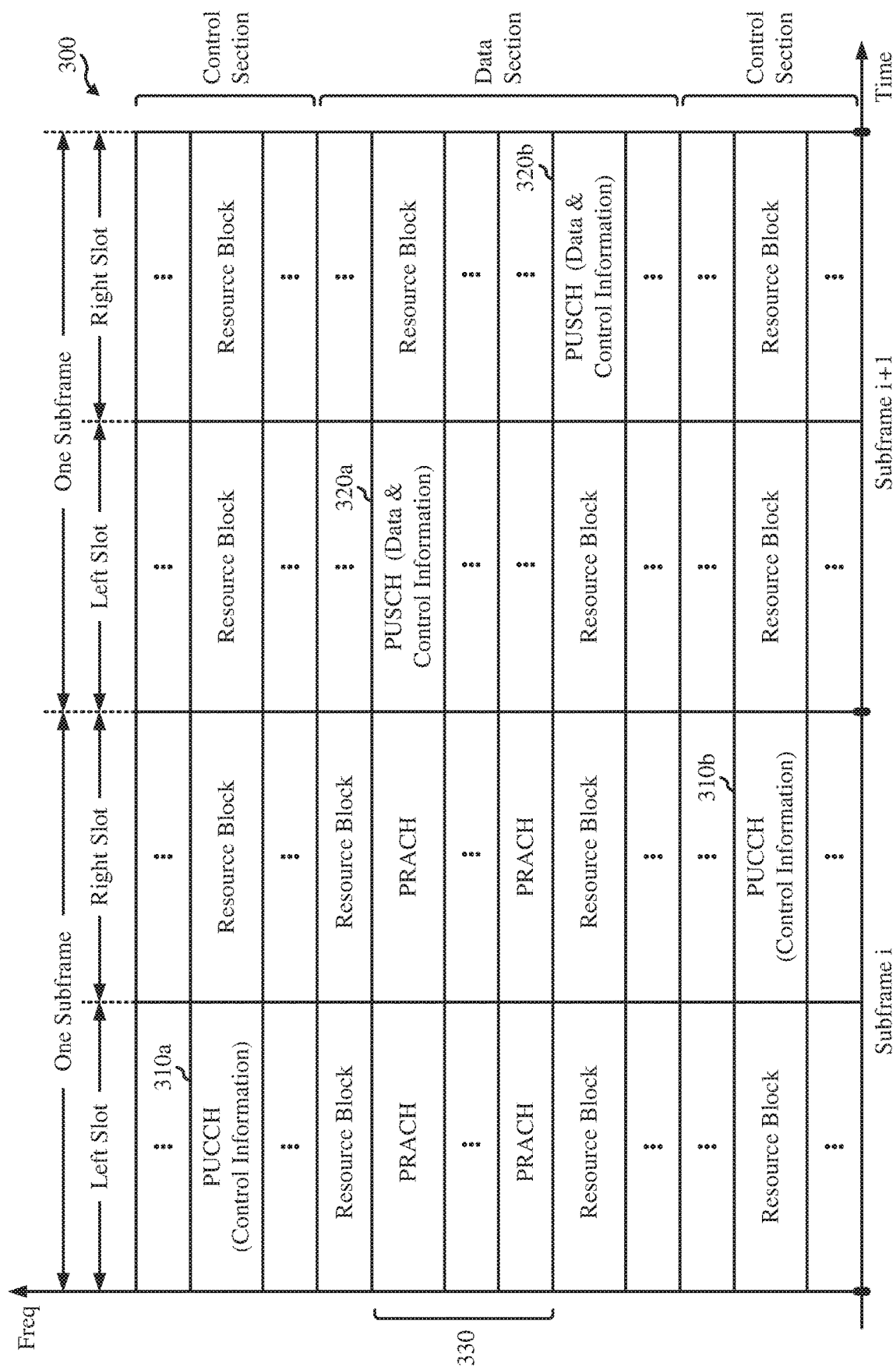
FIG. 3 is a diagram illustrating an example uplink frame structure in a telecommunications system, according to aspects of the present disclosure.

FIG. 3 is a diagram 300 illustrating an example of an uplink (UL) frame structure in a telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310a, 310b in the control section to transmit control information to a NodeB. The UE may also be assigned resource blocks 320a, 320b in the data section to transmit data to the NodeB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a sub-frame and may hop across frequency.

A set of resource blocks may be used to perform initial system access and achieve UL synchronization in a physical random access channel (PRACH) 330. The PRACH 330 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 4:
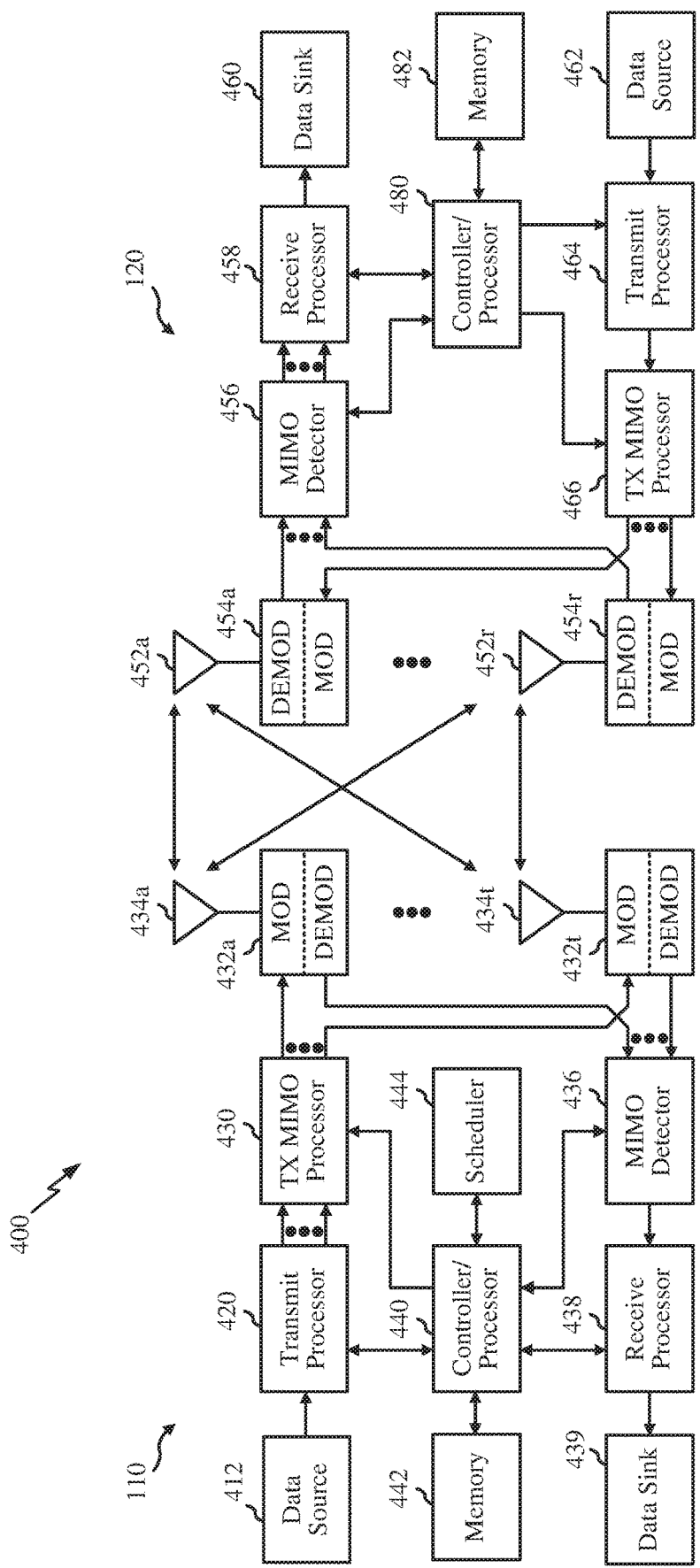
FIG. 4 is a block diagram conceptually illustrating a design of an example base station (BS) and user equipment (UE), according to aspects of the present disclosure.

FIG. 4 illustrates example components of the base station 110 and UE 120 illustrated in FIG. 1, which may be used to implement aspects of the present disclosure. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 7-8. The base station 110 may be equipped with antennas 434*a* through 434*t*, and the UE 120 may be equipped with antennas 452*a* through 452*r*.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DEMODs) 454*a* through 454*r*, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454*a* through 454*r* (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of various processes for the techniques described herein. The processor 480 and/or other processors and modules at the UE 120 may also perform or direct, e.g., the execution of the functional blocks illustrated in FIGS. 12-14, and/or other processes for the techniques described herein.

The memories 442 and 482 may store data and program codes for the base station 110 and the UE 120, respectively. A scheduler 444 may schedule UEs for data transmission on the downlink and/or uplink.

Figure 5:
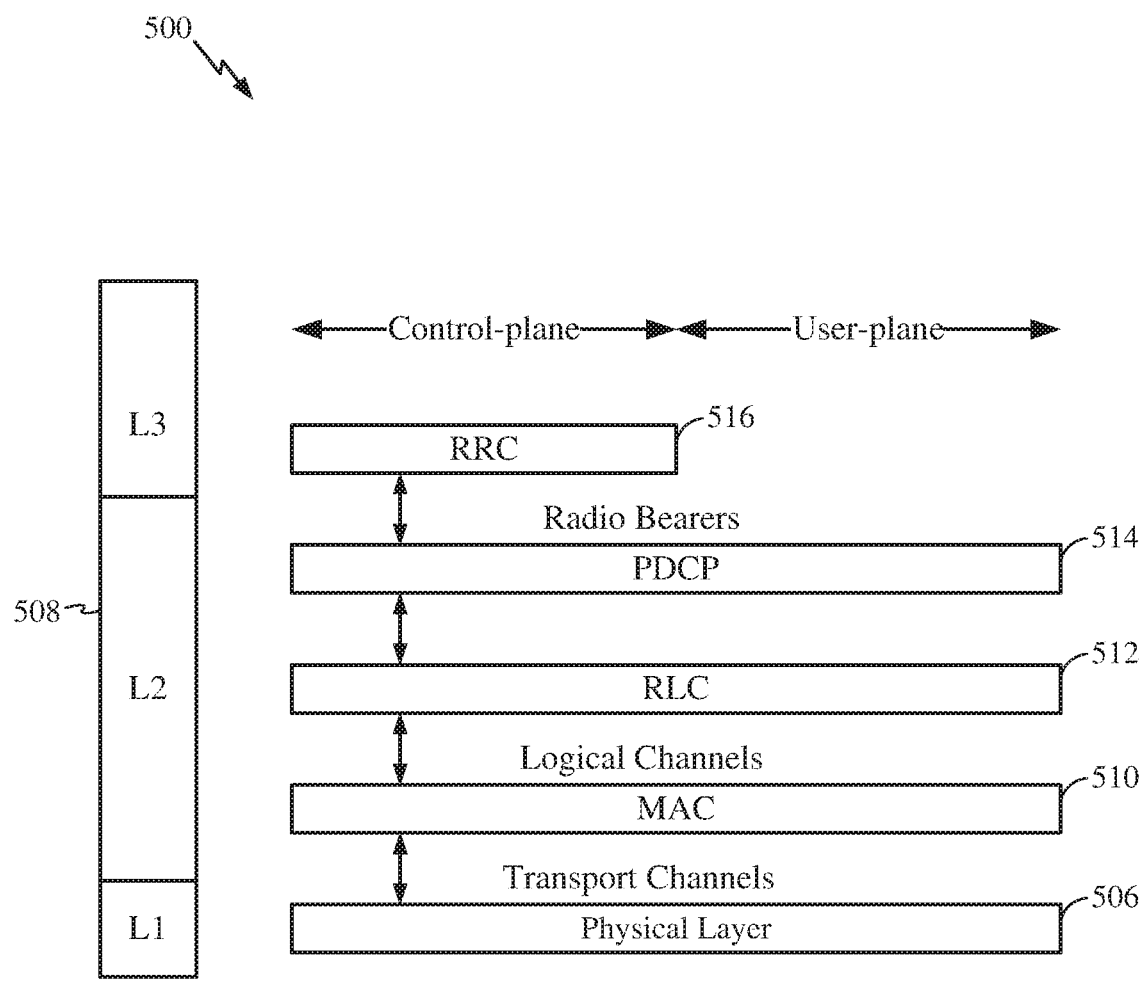
FIG. 5 is a diagram illustrating an example radio protocol architecture for the user and control planes, according to aspects of the present disclosure.

FIG. 5 is a diagram 500 illustrating an example of a radio protocol architecture for the user and control planes in LTE. The radio protocol architecture for the UE and the BS is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and BS over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the BS on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between BSs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and BS is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the BS and the UE.

A UE may be in one of a plurality of operating states. One of the states may be referred to as an RRC_IDLE state. In the RRC_IDLE state, the UE may not have an active connection to an AN, and the AN does not have a context for the UE.

Another of the operating states may be an inactive state. In the inactive state, there is a UE context in the AN, but no active connection between the UE and the AN. The inactive state may be referred to as "RRC_COMMON," "RRC_INACTIVE," "RRC_DORMANT," or as an "inactive state in RRC_CONNECTED mode" and such terms are used interchangeably herein. In the inactive state, the UE does not have any dedicated resources (e.g., time and frequency resources for the UE to transmit on that other UEs are not also transmitting on, time and frequency resources for signals that only the UE is intended to receive). The UE may monitor a paging channel with a long discontinuous reception (DRX) cycle (e.g., around 320 ms to 2560 ms). The UE can receive multimedia broadcast multicast service (MBMS) data while in this state. If the UE obtains data to transmit (e.g., a user activates the UE to start a voice call) to the network (e.g., to a BS or via a BS to another entity), then the UE can perform either a state transition procedure into RRC_CONNECTED mode (e.g., by sending an RRC connection resume message to an AN) or a data transmission procedure that may include contention based access (e.g., performing a contention procedure to access a BS).

Another of the operating states may be an active state. In the active state, there is a UE context in the AN and an active connection between the UE and the AN. In the active state, the UE may have dedicated resources for transmissions to or from the AN and other devices. The active state may be referred to as "RRC_CONNECTED mode," "RRC_CONNECTED active state," "RRC_DEDICATED," "RRC_ACTIVE," or "active state in RRC_CONNECTED mode" and such terms are used interchangeably herein. When the AN obtains information that the AN should set up an RRC connection with dedicated resources for the UE (e.g., the AN receives an RRC connection resume request message from the UE, the AN obtains data to be transmitted to the UE), then the AN may send a transmission (e.g., a page) to the UE to cause the UE to transition to the active state. When the AN acknowledges the RRC connection resume request message, then the UE may enter the active state.

Figure 6:
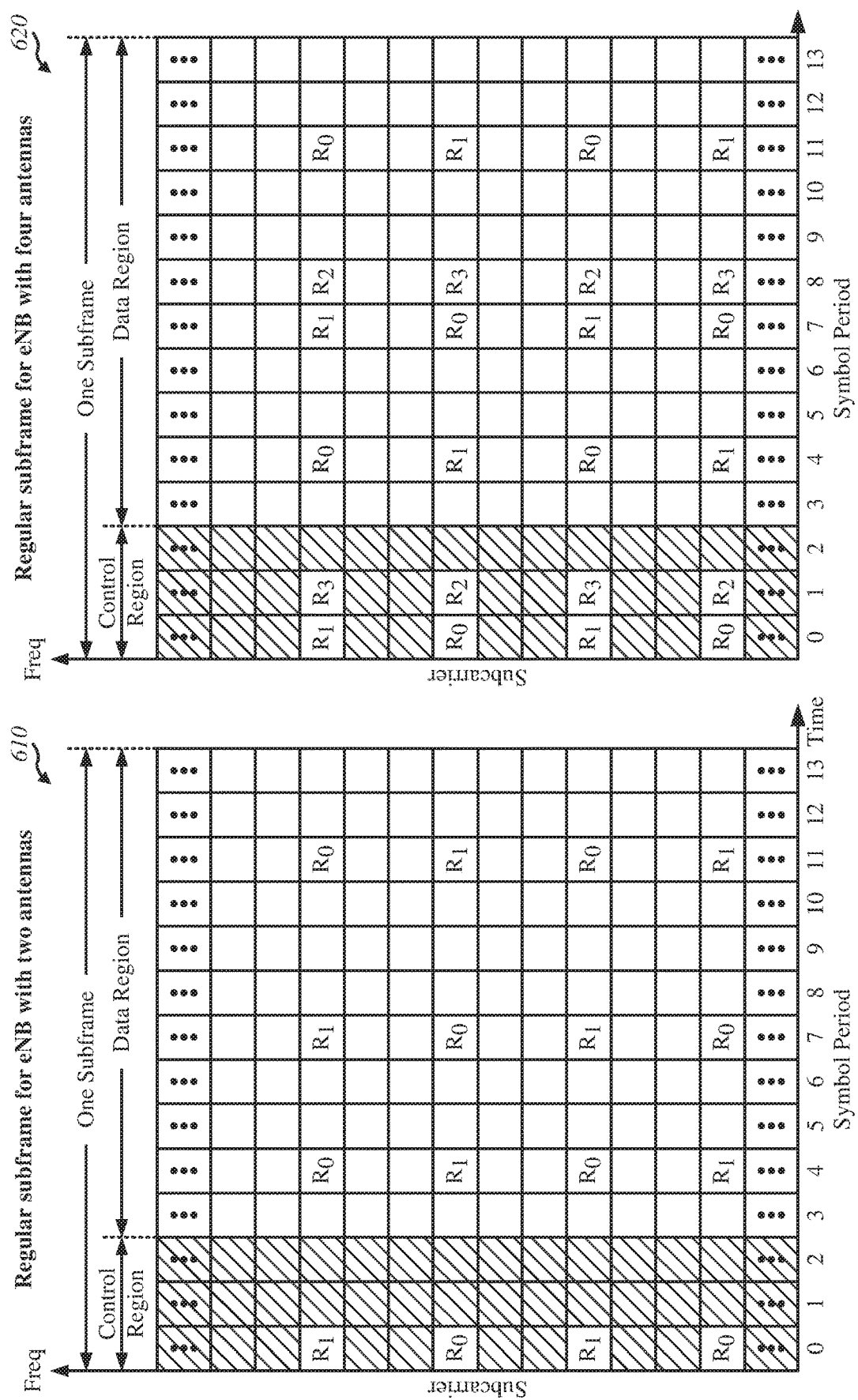
FIG. 6 illustrates an example subframe resource element mapping, according to aspects of the present disclosure.

FIG. 6 shows two exemplary subframe formats 610 and 620 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 610 may be used for a BS equipped with two antennas. A CRS may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 6, for a given resource element with label $R_a$, a modulation symbol may be transmitted on that resource element from antenna a, and no modulation symbols may be transmitted on that resource element from other antennas. Subframe format 620 may be used for a BS equipped with four antennas. A CRS may be transmitted from antennas 0 and 1 in symbol periods 0, 4, 7 and 11 and from antennas 2 and 3 in symbol periods 1 and 8. For both subframe formats 610 and 620, a CRS may be transmitted on evenly spaced subcarriers, which may be determined based on cell ID. Different BSs may transmit their CRS s on the same or different subcarriers, depending on their cell IDs. For both subframe formats 610 and 620, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q , q+2Q , etc., where $q \in \{0, \ldots, Q-1\}$.

The wireless network may support hybrid automatic retransmission (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple BSs. One of these BSs may be selected to serve the UE. The serving BS may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

Various reference signals may be used by both the UE and the BS to perform uplink and downlink channel estimation in order to help demodulate and decode data packets. For example, a BS may send a cell specific reference signal (CRS) to a UE, which measures the reference signal and uses the measurements as a reference point for setting uplink power levels. On the BS side, the BS may receive a sounding reference signal (SRS), which may be used by the BS to estimate uplink channel quality over a certain bandwidth and uplink frequency scheduling, timing, etc. Generally, DL reference signals are used to determine information related to the DL channel state and UL reference signals are used to determine information related to the UL channel state.

Certain systems may also allow for DL-UL RS reciprocity whereby UL reference signals may be used to infer the state of the DL channel and DL reference signals may be used to infer the state of the UL channel. For example, in a time-division duplex (TDD) system where UL and DL transmissions are separated by time and may occur in the same frequency band, there typically is a good reciprocity between UL and DL RS and channel conditions for DL may be inferred based on the UL RS and vice versa. For example, a base station may use an SRS sent by a UE to infer DL channel state and select a DL precoder. Similarly, a CRS or CSIRS from the BS may be used by the UE to select UL power control or UL precoder. In summary, for systems with reciprocity, the reference signals may have multiple purposes, for example, they may be useful for DL and/or UL scheduling.

However, some transmitters may be capable of transmitting RSs modified for a specific purpose. These modified or customized RSs, while suitable for a specific purpose, may be unsuitable for use by a receiving apparatus to infer the reverse channel state, even when the channel has reciprocity. It should be noted that while multiple examples of scenarios are provided for where UL and DL RSs may not be suitable even when a channel has reciprocity, these examples are illustrative and not intended to be limiting.

As an example of a modified uplink RS, a UE may pre-code an UL SRS RS based on a DL noise covariance matrix (e.g., DL $R_{nn}$) in order to convey a pre-whitened channel for DL scheduling and precoder selection. In such a case, any channel estimate using the SRS signal may be only applicable for DL channel state measurements and not for UL scheduling. In another example, the UE may pre-code the UL SRS using a pre-coder selected for UL transmission. Channel estimates using such an SRS also may not be useful for DL channel state measurements. In another example, the UE, while not pre-coding the UL SRS, transmits the SRS to enable a UE-to-UE sidelink channel sounding, which may also not be useful for DL channel state measurements.

Similarly, a modified DL CSI-RS may be precoded by a BS based on beams selected by the scheduler. In such a case, while an effective channel may be inferred by the UE from the reference signal for DL CQI measurements, the RS may not be suitable for UL channel state measurements, for example, for UL pre-coder selection. In another example, the base station may pre-code the DL CSI-RS based on the UL noise covariance matrix (e.g., UL $R_{nn}$), where the UL $R_{nn}$ may include only the inter-cell interference component that is common to the UEs of the cell, in order to convey the pre-whitened channel to the UEs of the cell. In such a case, the DL CSI-RS may be suitable for, for example, UL pre-coder selection, but may not be suitable for DL CQI measurement and reporting. In another example, the BS may provide a non-pre-coded DL CSI-RS for enabling BS-to-BS channel sounding, which is not useful for UL channel state measurements by a UE. In another example, a particular UE may be served by one BS on the UL and another different BS on the DL. In such a case, both BSs may transmit a DL RS, but those DL RS s are meant for different purposes and the RS transmitted from the BS serving the UE on the DL may not be suitable for use by the UE in order to select UL power control or UL pre-coding. Similarly, the BS should use the correct SRS for the corresponding purpose.

In certain cases, UL/DL bandwidth may be dynamically adjusted independently, and there may be a mismatch between the bandwidth covered by the SRS, for example the SRS on the UL bandwidth and the bandwidth used on the DL. This mismatch may also make the RS used for UL/DL unsuitable for use on DL/UL, respectively.

As there are many types of RS suitable for specific purposes, there is a use for signaling that identifies a RS purpose to enable a receiver to determine whether reciprocity may be applied to a particular received RS. In summary, there is a need for signaling that identifies the type of each reference signal in terms of the purpose it is meant for—e.g., whether it is for downlink scheduling purposes, uplink scheduling purposes, or sidelink, BS-to-BS sounding.

Example Reference Signal Purpose Indication

Aspects of the present disclosure provide techniques for signaling that identifies the type of each reference signal (RS), for example, in terms of the purpose it is meant for. As described in further detail below, a BS may provide such signaling to a UE which may then transmit the indicated type or types of RS accordingly.

Figure 7:
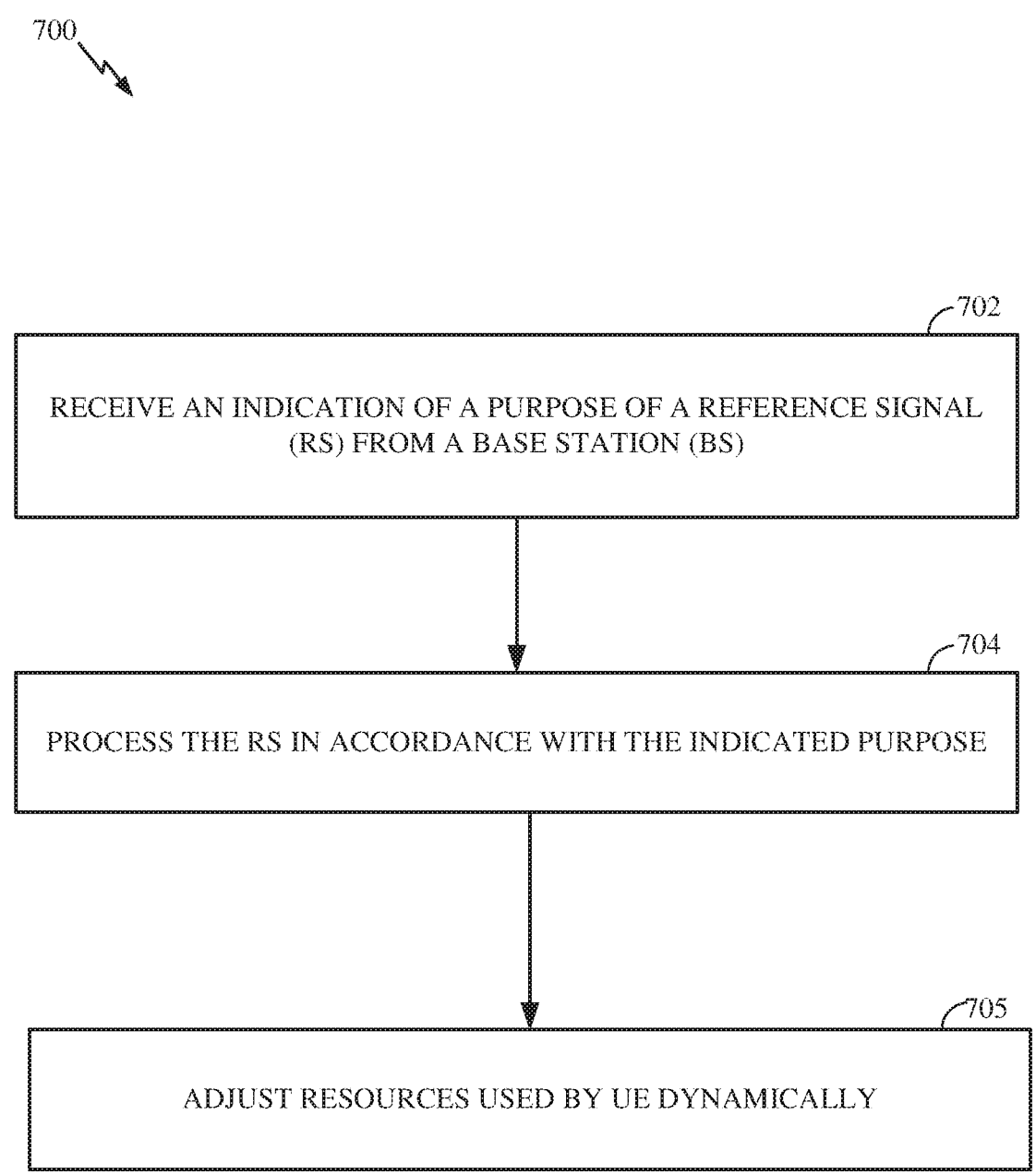
FIG. 7 illustrates example operations for wireless communications by a UE, in accordance with aspects of the present disclosure.

FIG. 7 illustrates example operations 700 for wireless communications by a UE, in accordance with aspects of the present disclosure. Operations 700 may be performed, for example, by a UE 120 illustrated in FIG. 1.

Operations 700 begin, at 702, by receiving an indication of a purpose of a reference signal (RS) from a base station (BS). At 704, the UE processes the RS in accordance with the indicated purpose. At 706, the UE adjusts resources used by the UE (for RS) dynamically.

Figure 8:
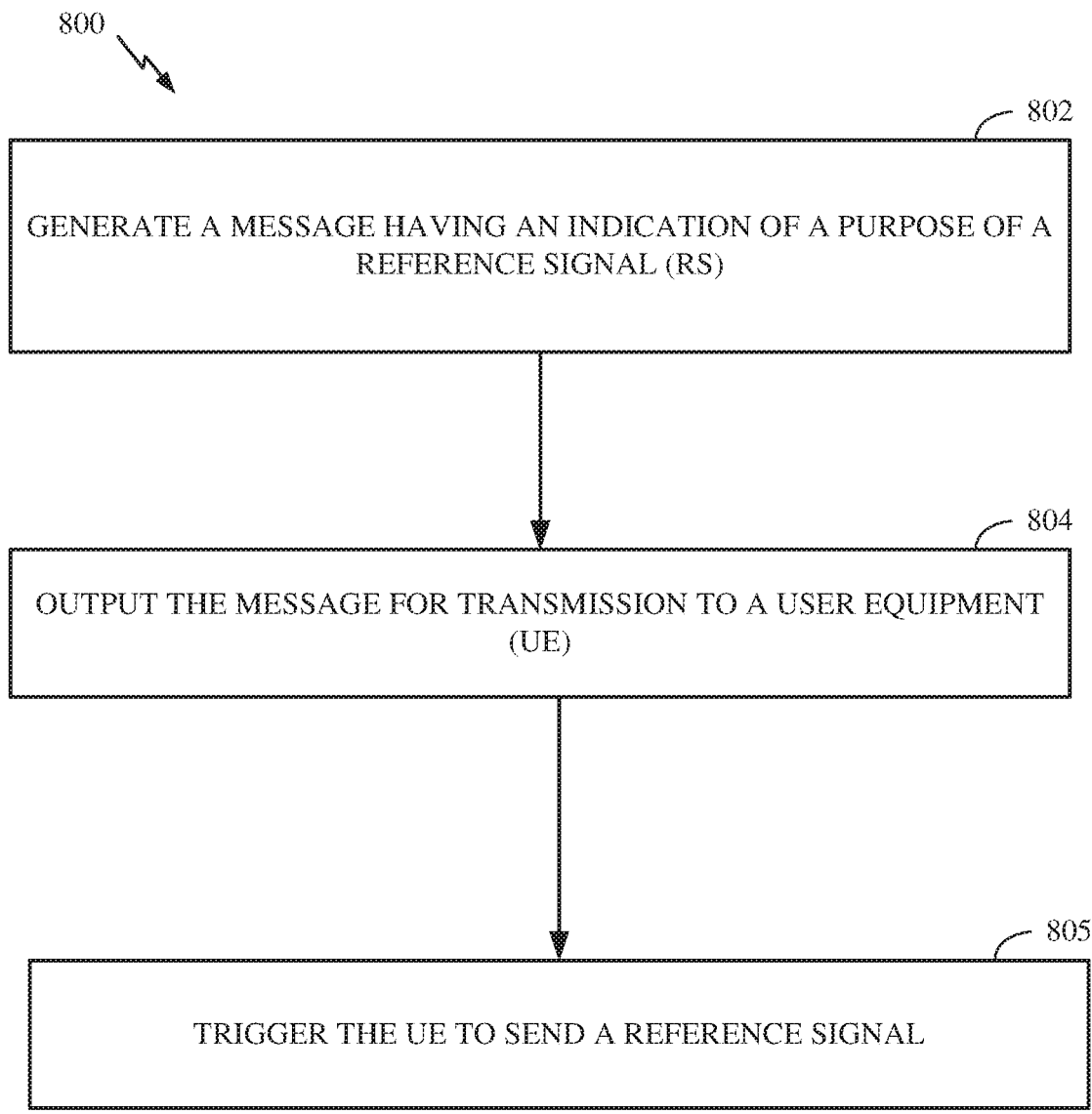
FIG. 8 illustrates example operations for wireless communications by a BS, in accordance with aspects of the present disclosure.

FIG. 8 illustrates example operations 800 for wireless communications by a BS, in accordance with aspects of the present disclosure. Operations 800 may be performed, for example, by a BS 110 shown in FIG. 1 to provide an indication to a UE performing operations 700.

Operations 800 begin, at 802, by generating a message having an indication of a purpose of a reference signal (RS). At 804, the BS outputs the message for transmission to a UE. At 806, the BS triggers the UE to send a RS. For example, the BS may trigger the UE to send a message containing RS according to the indicated purpose.

According to aspects of the present disclosure, for an uplink (UL) side RS, for example, where a BS triggers a UE to send a specific SRS, the BS may indicate the purpose of a SRS to be sent by the UE. This trigger may be dynamically configured, scheduled semi-statically, or based on an activation/deactivation message via, for example a (downlink-related or uplink-related) DCI or MAC control element. The UE then may send the SRS based on the indication and the BS may match the SRS with the corresponding trigger. The indication of the SRS purpose may indicate that the SRS is for UL purposes (e.g., UL beam management), DL purposes (e.g., if reciprocity is assumed) or a sidelink measurement (e.g., SRS for UL, SRS for DL, SRS for SL).

In some cases, the SRS purpose may be inferred implicitly by the UE (e.g., based on a manner or location of an indication). For example, a BS may trigger a UE to send SRS via a trigger contained within a DL-related DL control information (DCI). The UE, upon receiving the SRS trigger within the DCI, may infer that the SRS purpose is for DL and may then send an appropriate SRS. In some cases, different groups or sets of SRS resources may be used for different purposes and the UE may use the right resources after inferring the purpose. In another example, a BS trigger may be contained within the uplink-related downlink control information, and, based on inference, the UE may send SRS, with the BS knowing that the purpose of the SRS is for UL.

In another example, the SRS purpose may be preconfigured in advance. For example, a BS may configure a UE with resources for a periodic SRS and specify the SRS purpose for the periodic SRS. A periodic SRS configuration may allocate multiple periodic SRSs with multiple SRS purposes. For example, a BS could allocate a set of SRS resources for UL, DL, and SL, each potentially with their own bandwidth configurations, power controls, bands, etc. For example, for power control configurations, different SRSs may reuse the same UL power control inner loop, but may be configured with different open loop power control offsets based on SRS purpose. In some cases, the offsets may be signaled to the UE or may be predetermined.

According to certain aspects, the SRS purpose may influence the amount of resources required by the SRS. As described above, SRS resources may include resources such as bandwidth, number of antenna ports, transmit power, and other such resources. In certain cases, UE operating bandwidth may be adjusted dynamically or semi-statically in coordination with the BS. This approach may be referred to as On-Demand bandwidth adjustment. Where the UE requires a large amount of DL traffic (e.g., a_burst), the BS may expand the DL operating bandwidth, while UL operating bandwidth may remain the same (or be reduced or expanded). The associated UL/DL SRS may be adjusted as well. For example, if an SRS is configured for UL scheduling, the SRS should be sent on the UL operating bandwidth with an SRS purpose indicating that the SRS is for UL and if an SRS is configured for reciprocity based DL scheduling, the SRS could be sent on DL operating bandwidth with a corresponding indication provided.

In another example, where multiple component carriers (CCs) are used, the types of SRS for different CCs may vary. In some cases, certain SRS may not be applicable to certain CCs. For example, for a non-paired DL CC without a corresponding UL CC, SRS for UL purposes may not be supported (as there is no need). An SRS may then be limited to only DL purposes.

In certain cases, prioritization rules for SRS transmissions may be such as where the UE is configured with multiple SRS purposes which use the same resources on multiple carriers, or if the UE is power constrained, the SRS purposes may be prioritized based on a set of rules. These rules for prioritizing SRS transmissions may be defined, for example, in a standard that determines the UE priorities. One such prioritization rule may prioritize SRS for DL purposes over SRS for UL purposes and both DL and UL purposes may be prioritized over SRS for sidelink purposes.

As noted above, SRS resources may be used for one or more different purposes, such as beam management, non-codebook based precoding, DL CSI acquisition, and UL CSI acquisition. In some cases, a UE may be configured with different groups of SRS resources for different purposes. For example, one group may be used beam management, another group may be used for DL CSI acquisition, and/or still another group may be used for UL CSI acquisition.

In some cases, a UE may provide an indication of its capability (to a gNB) of its supported number of resource sets and supported number of SRS resources per set. For example, the UE may indicate per subset support or the supported number of SRS resources that can be transmitted simultaneously per set.

According to aspects of the present disclosure, for a DL side RS, a BS may send a control message containing an indication of the purpose of an RS, such as a CSI-RS, within a slot that includes a CSI-RS transmission. These purposes may include CSI-RS for DL, CSI-RS for UL, and CSI-RS for BS-to-BS. The signaling may indicate a CSI-RS purpose for each of multiple sets of CSI-RS resources within a slot. This signaling may be a part of a slot format control message. CSI-RS resources may be dynamically configured, scheduled semi-statically, or based on an activation/deactivation message. This signaling may also be indicated as a part of a higher layer configuration, such as a RRC configuration, and include periodicity information for the CSI-RS resources. Further, a single CSI-RS process (e.g., measurement, reporting, etc.) may be associated with one or more CSI-RS purposes.

The indications of the type of reference signals and the corresponding resources will help clarify the purpose for which the reference signals may be used. This may enable improved operation of the system by allowing a receiver to use each reference signal for a correct purpose. Overall, it may improve system efficiency by improving scheduling decisions. The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for determining a maximum available transmit power of the UE, instructions for semi-statically configuring a first minimum guaranteed power available for uplink transmission to a first base station and a second minimum guaranteed power available for uplink transmission to a second base station, and instructions for dynamically determining a first maximum transmit power available for uplink transmission to the first base station and a second maximum transmit power available for uplink transmission to the second base station based, at least in part, on the maximum available transmit power of the UE, the first minimum guaranteed power, and the second minimum guaranteed power.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving an indication of a purpose of a reference signal (RS) from a base station (BS), wherein the indication of the purpose indicates whether the RS is configured for reciprocity; and
   processing the RS in accordance with the indicated purpose.

2. The method of claim 1, wherein the processing comprises generating a message containing the RS in accordance with the indicated purpose; and outputting the message for transmission.

3. The method of claim 2, wherein the indicated purpose is specified in a RS triggering message.

4. The method of claim 2, wherein the indicated purpose is inferred based a location of a RS triggering message.

5. The method of claim 4, wherein the location of the RS triggering message is within one of a downlink-related downlink control information (DCI) or uplink-related DCI.

6. The method of claim 2, wherein the indication is received as a part of configuration for one or more RS resources for the UE.

7. The method of claim 6, wherein the configuration is for one or more groups of RS resources, wherein each said group contains one or more sounding reference signal (SRS) resources for the UE.

8. The method of claim 7, wherein at least two of the different groups are for different purposes.

9. The method of claim 8, wherein the purposes comprise at least one of beam management, DL CSI acquisition, and UL CSI acquisition.

10. The method of claim 6, wherein the processing further comprises prioritizing the one or more RS resources based on the indication.

11. The method of claim 1, wherein the indicated purpose is specified in a channel state information reference signal (CSI-RS) configuration.

12. The method of claim 11, wherein the CSI-RS configuration is included in a slot format message indicating CSI-RS resources for one or more CSI-RS configurations.

13. The method of claim 11, wherein the CSI-RS configuration is included in a radio resource control (RRC) message indicating CSI-RS resources for one or more CSI-RS configurations.

14. The method of claim 11, wherein the CSI-RS configuration is associated with one or more CSI-RS types.

15. A method for wireless communications by a base station (BS), comprising:

generating a message having an indication of a purpose of a reference signal (RS) wherein the indication of the purpose indicates whether the RS is configured for reciprocity; and outputting the message for transmission to a user equipment (UE).

16. The method of claim 15, wherein the message comprises a RS triggering message for triggering the UE to send a reference signal.

17. The method of claim 15, wherein the indicated purpose is based a location of a RS triggering message.

18. The method of claim 17, wherein the location of the RS triggering message is within one of a downlink-related downlink control information (DCI) or uplink-related DCI.

19. The method of claim 15, wherein the indication is output as a part of configuration for one or more RS resources for the UE.

20. The method of claim 19, wherein the configuration is for one or more groups of RS resources, wherein each said group contains one or more sounding reference signal (SRS) resources for the UE.

21. The method of claim 20, wherein at least two of the different groups are for different purposes.

22. The method of claim 21, wherein the purposes comprise at least one of beam management, DL CSI acquisition, and UL CSI acquisition.

23. The method of claim 15, wherein the indicated purpose is specified in a channel state information reference signal (CSI-RS) configuration.

24. The method of claim 23, wherein the CSI-RS configuration is included in a slot format message indicating CSI-RS resources for one or more CSI-RS configurations.

25. The method of claim 23, wherein the CSI-RS configuration is included in a radio resource control (RRC) message indicating CSI-RS resources for one or more CSI-RS configurations.

26. The method of claim 23, wherein the CSI-RS configuration is associated with one or more CSI-RS types.

27. An apparatus for wireless communications by a user equipment (UE), comprising:

means for receiving an indication of a purpose of a reference signal (RS) from a base station (BS), wherein the indication of the purpose indicates whether the RS is configured for reciprocity; and means for processing the RS in accordance with the indicated purpose.

28. An apparatus for wireless communications by a base station (BS), comprising:

means for generating a message having an indication of a purpose of a reference signal (RS), wherein the indication of the purpose indicates whether the RS is configured for reciprocity; and means for outputting the message for transmission to a user equipment (UE).

* * * * *